Aug. 5, 1941.                    W. B. HARGREAVES                        2,251,335
                                  PHOTOGRAPHIC DEVICE
                                 Filed July 30, 1940                    2 Sheets-Sheet 1
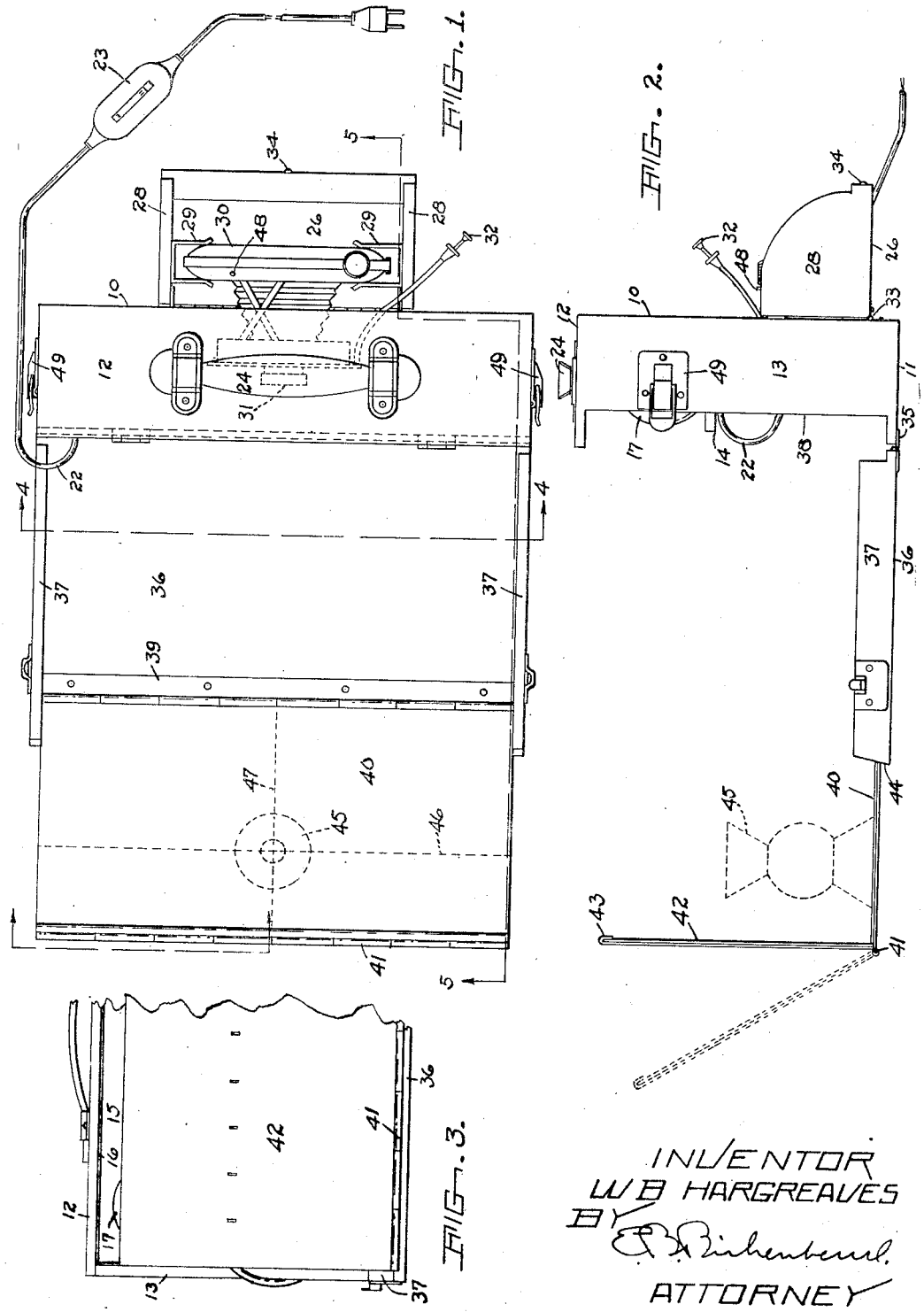
INVENTOR
W B HARGREAVES
BY
ATTORNEY Aug. 5, 1941.  W. B. HARGREAVES  2,251,335
PHOTOGRAPHIC DEVICE
Filed July 30, 1940  2 Sheets-Sheet 2
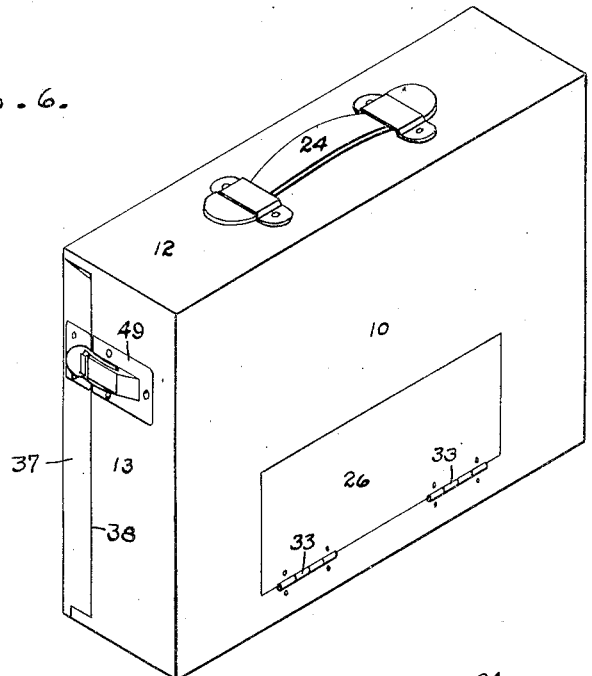
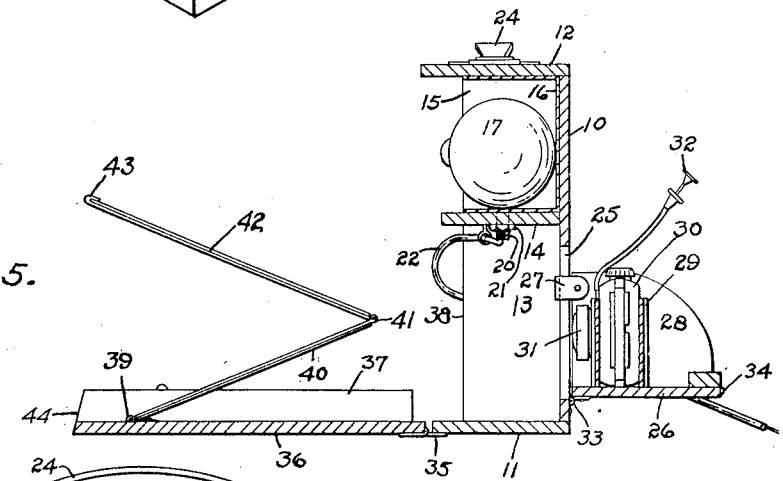
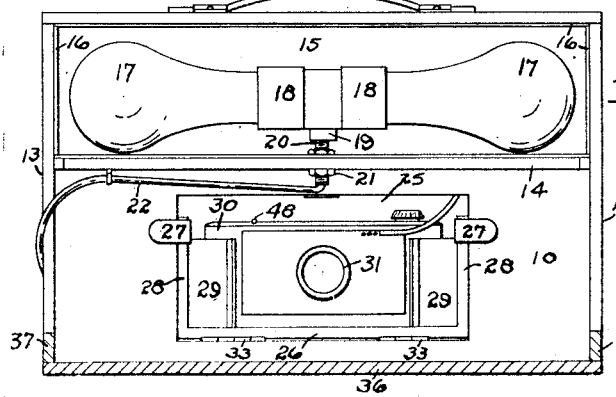
INVENTOR
W.B. HARGREAVES
BY
ATTORNEY Patented Aug. 5, 1941

2,251,335

UNITED STATES PATENT OFFICE 2,251,335

PHOTOGRAPHIC DEVICE

Willis B. Hargreaves, Portland, Oreg.

Application July 30, 1940, Serial No. 348,430

3 Claims. (Cl. 88—24)

This invention relates generally to the photographic art and particularly to a photographic device.

The main object of this invention is to construct a photographic device especially adapted for use by salesmen, buyers, designers and others interested in recording likenesses of articles of merchandise ordered, or to be ordered, or reproduced, or in stock or for any other purpose.

The second object is to construct a device of the class described whereby operators of only limited photographic experience may successfully photograph objects for the purposes stated without the employment of special studios and lighting equipment, and with no special knowledge of the photographic art.

The third object is to produce a device of the class described which will be portable and light in weight and collapsible to a small fraction of the cubical size of similar devices now on the market.

The fourth object is to construct a device of the class described wherein a standard camera may be removably inserted into the device, the only change required being that of a short focus lens.

The fifth object is to so construct the device that the camera unit may be easily removable for loading purposes.

The sixth object is to construct a device of the class described in which illumination, focusing, timing and aperture control will be eliminated by the fixing of these factors.

The seventh object is to construct the photographic device of the class described provided with a folding screen in front of which the object to be photographed is placed at a fixed point, thereby establishing the focus and lighting conditions of the operation.

These and other objects are accomplished in the manner set forth in the following specification as illustrated in the accompanying drawings, in which:

Fig. 1 is a plan of the device.

Fig. 2 is a side elevation thereof.

Fig. 3 is a fragmentary rear elevation of the device.

Fig. 4 is a section taken along the line 4—4 in Fig. 1.

Fig. 5 is a section taken along the line 5—5 in Fig. 1 showing the screen partially folded.

Fig. 6 is a perspective view of the device in a folded position.

Similar numerals refer to similar parts throughout the several views.

Referring in detail to the drawings there is shown a case consisting of a front 10, a bottom 11, top 12 and side walls 13. A horizontal shelf 14 is placed between the bottom 11 and the top 12 to form a light compartment 15 which is preferably lined with metal 16. A pair of electric lamps 17 are mounted in the sockets 18 which are supported by the fixture 19 on the threaded nipple 20 which passes through the shelf 14 and is secured thereto by means of the nuts 21. A suitable lamp cord 22 supplies current to the lamp 17 under the control of the manually operated switch 23. A handle 24 is provided on the top side of the top 12.

In the front 10 is formed an opening 25 which is provided with a closure 26 whose opening movement is limited to horizontal by the angular stops 27 which are fastened to the door sides 28 and engage the interior of the front 10 when the door 26 is in a wide open position.

To the inner sides of the member 28 are secured the channel members 29 between which may be inserted the frame of the camera 30 which is provided with a special short focus lens 31. A manually operated shutter trip 32 is provided.

The door 26 is mounted on the hinges 33 and is held in a closed position by means of a spring latch 34. It will be noted that the sides 13 are somewhat narrower than the bottom 11 and top 12.

Attached to the bottom 11 by means of the hinge 35 is a back 36 whose end cleats 37 stiffen the back 36 and close the space between the edges 38 of the ends 13 and the back 36.

Hinged to the back 36 by means of an elongated hinge 39 is the floor 40 upon which the object to be photographed is placed. Attached to the floor 40 by means of a hinge 41 is a background screen 42 whose edge 43 is preferably stiffened by bending same backwardly upon itself.

It will be noted that the hinge 39 is spaced somewhat from the end 44 of the back 36, which limits the distance the floor 40 can be lowered. That is, it cannot be lowered below the plane of the back 36 whereas the screen 42 can be moved to the vertical position as shown in Fig. 2 and moved outwardly as shown in dotted lines in that figure.

The operation of the device is as follows:

Assuming that the vase 45 is to be photographed, it is first placed on the floor 40 where it is preferably indicated by means of a dotted line 46 which is the focal point of the device. The object 45 is more closely located as to position by the line 46 and the intersecting line 47. The operator now opens the door 26 and by pressing on the button 48 releases the lens unit 31 which now moves into a focal position under the action of a self contained spring within the camera itself, the object to be photographed being in position, the operator then makes the desired exposure by operating the shutter trip 32, while the required lighting is furnished by the operation of the lamps 17 under the control of the switch 23.

It is desirable to provide side latches 49 on the member 13 and 37 to hold the case in a closed position when not in use.

From the foregoing, it will be observed that it will be possible for even an inexperienced person to take a satisfactory picture by following a few simple directions.

It must be understood that devices are now on the market which are intended to accomplish the same purpose for which my device is employed. The best of these which has come to my attention is non-collapsible, and occupies more than ten times the cubical space occupied by my device and weighs proportionately more, which means that it is not actually a portable photographic device by means of which photographic records may be made by an unskilled person with any degree of certainty or satisfaction. I therefore do not claim devices of this type broadly but I do intend to cover all such forms and modifications as fall fairly within the appended claims.

I claim:

1. In a device of the class described, a combination of an upright case having a fixed top, bottom, and two sides and having a horizontal dividing partition between the top and bottom forming a light compartment above the partition and a camera compartment below the partition, a front covering the light and camera compartments said front having an opening therein communicating with the camera compartment and having a door for said opening adapted to be folded outwardly to form a shelf, a short focus camera mounted on said door, a back for said case hinged to the bottom thereof, a floor hinged to said back in a manner to form an extension therefor, a screen hinged to said floor at the edge thereof which is remote from said case and lamps mounted in said light compartment adapted to project light toward said screen.

2. In a device of the class described, the combination of an upright case having a horizontal dividing partition and having one open side, a back forming a closure for said open side and hinged to the lower edge thereof, a floor hinged to the inside of said back between the edges thereof, a screen hinged to the edge of said floor, said screen being adapted to move to a vertical position or to swing away from said case, lamps disposed within said case above said partition and a camera hingedly mounted in said case below said partition and adapted to swing outwardly therefrom, said camera having a short, fixed focal lens adapted to focus upon an object mounted on said floor.

3. In a device of the class described the combination of a case having a horizontal dividing partition forming a light compartment above same and a camera compartment below same, said case having an opening in the side thereof, a closure hinged to the lower edge of said opening, a pair of spaced guides mounted on said closure adapted to hold a camera therebetween in a manner that said camera will be upright when the closure is horizontal, and means for positioning said camera at a fixed focus.

WILLIS B. HARGREAVES.